Patented Jan. 12, 1954

2,666,142

UNITED STATES PATENT OFFICE 2,666,142

METHOD OF TESTING BOREHOLE LOGGING INSTRUMENTS

Gerhard Herzog and Karl C. ten Brink, Houston, Tex., assignors to The Texas Company, New York, N. Y., a corporation of Delaware No Drawing. Application March 28, 1950, Serial No. 152,488

3 Claims. (Cl. 250—43.5)

This invention relates generally to the logging of bore holes or wells by radioactivity and more particularly to a method of calibrating or otherwise testing a well logging instrument of the type used in making neutron logs. The principal object of the invention is the provision of such a method by means of which an operator at the surface, for instance in a laboratory, can test an instrument of this kind under conditions simulating the conditions which are present in the sub-surface formations traversed by a bore hole or well.

In the making of neutron logs of a bore hole, as is well known, an elongated instrument housing or capsule is lowered and raised through the bore hole suspended from a cable which conducts the response of the instrument in the bore hole to the amplifying and recording apparatus at the surface. Neutron logging may be of two kinds in the first of which neutrons from a source mounted within the instrument housing pass outwardly to bombard and penetrate the surrounding formations in which, due to nuclear collision with the atoms in the formation, gamma rays may be ejected or induced, some of these gamma rays passing into the bore hole where they strike a gamma ray detector. A suitable shield is placed between the source and the detector within the instrument housing for absorbing those gamma rays from the radiation source which would otherwise pass directly from the source to the detector to cause spurious indications. In the other form of neutron logging neutrons from a similar source within the housing penetrate the surrounding formations wherein they may be scattered or diffused, some of the diffused neutrons passing into the bore hole where they strike a neutron detector. In both forms of logging the instrument housing usually contains amplifying and other electronic equipment which, among other things, serves to impress the output of the detector onto the cable through which the detector response is conducted to the recording equipment at the surface. For purposes of example, a neutron logging instrument which measures the intensity of scattered neutrons is disclosed in the U. S. Letters Patent No. 2,483,139 granted September 27, 1949, to Gerhard Herzog. Again, by way of example, a neutron logging instrument which measures the intensity of induced gamma rays is disclosed in the U. S. Letters Patent No. 2,475,137 granted July 5, 1949, to Gerhard Herzog.

In the logging methods described above, the response of the detector whether it be a gamma ray counter or a neutron detector depends generally upon the amount of hydrogen in the formation being bombarded. The hydrogen in the formations is usually that contained in water or hydrocarbon oil and the amount of either of these liquids in the formation is dependent upon the porosity of the formation. It is, of course, desirable to calibrate the logging instrument and this is obviously difficult if not impossible when the instrument is in the bore hole. Again it is frequently desirable to test the logging instrument in various ways such, for instance, as in varying the distance between the source and the detector within the instrument housing while the instrument is situated so that the detector response will be similar to that which it would be if it were in the bore hole at an inaccessible depth.

In accordance with the preferred form of the invention, the well logging instrument at some convenient location at the surface is surrounded by a mass of a porous material such as sand, the grain particles of which have a selected particle size distribution. The pore spaces of the sand mass surrounding the instrument are filled with a mixture of two liquids, one of these liquids containing hydrogen such, for example, as water or oil and the other of the liquids containing no hydrogen and preferably having a low capture cross-section for slow neutrons. The proportions of the two liquids are varied so that the amount of the hydrogen-containing liquid will be any desired percentage of the total pore volume of the mass. If desired several different sand masses may be provided, each containing a mixture of the two liquids in a different ratio.

Assuming that the hydrogen-containing liquid alone is used to fill the pore spaces of the sand mass and that the pore spaces in the sand comprise 40% of the total volume of the mass, 40% of the total volume would comprise a hydrogen-containing material and the well logging instrument placed within the mass would show a high response for the secondary radiation, i. e., the induced gamma rays or the neutrons scattered in the mass and returned to the detector. At the other extreme, assuming that the pore spaces are filled only with the liquid having a low capture cross-section for neutrons there would be substantially no hydrogen present and the response of the detector to secondary radiation would be a minimum. The foregoing is true for an arrangement where fast neutrons are emitted by the source and where the source is in close proximity to the detector. If, however, a source having a different energy spectrum or if the geometry, i. e., the distance between the source and detector is changed, the above-mentioned relationship between hydrogen content and detector response may be changed. The detector response curve is, moreover, dependent on the thickness of the fluid layer and the characteristics of the fluid between the logging instrument and the walls of the bore hole. It follows then that by controlling the proportions of the two liquids within the sand mass, or by using several sand masses having mixtures of the liquids in different ratios, any desired amount of the hydrogen-containing liquid can be presented to the bombarding action of the neutrons from the source within the instrument housing. In this manner, knowing the amount of hydrogen, i. e., the "effective hydrogen porosity" of the mass, the instrument can be calibrated. Thus, when the instrument is subsequently run into bore hole opposite a predetermined sub-surface formation the response of the instrument will indicate the amount of hydrogen, whether it be water or oil, present in the formation.

In most oil fields a 40% porosity of a formation is considered about the maximum and the porosity will vary generally from about 10 to 40%. This is the actual porosity, i. e., the percentage of the total volume occupied by the pore spaces. If all of the pore spaces of, say, a 40% sand were full of oil this would be considered a "100% oil saturation" and if one-half of the pore spaces are full of oil it would be considered a "50% oil saturation," etc.

Another way of simulating bore hole conditions is by surrounding the instrument to be tested with a mass of sand and filling the pore spaces to predetermined amounts or percentages with a hydrogen-containing liquid such as oil. Thus, as indicated above if the pore spaces of a 40% sand are one-half filled with oil or water the instrument being tested or calibrated should indicate a 50% oil sand. However, the reading may not accurately reproduce the value which would be obtained with a sand which has, to begin with, a porosity of only 20% and is saturated to 100% with oil. This is caused by a difference in the bulk density when half of the pores are filled with air whereas they ought to be filled with the matrix material, that is, with sand grains.

With the preferred method of this invention, however, the pore spaces of the sand mass are always full of the liquid mixture when the tests are being made. The density of the non-hydrogeneous liquid placed in the pore spaces of the sand should as far as possible, be maintained the same as the density of the sand itself. Thus the bulk density of the mass for a predetermined "effective hydrogen porosity" will be the same as that of a sub-surface formation having that same porosity.

As has been explained above this method of simulating the conditions in a formation surrounding a bore hole is particularly valuable in calibrating the logging instrument. It is often necessary or desirable to make other tests. In certain conditions, for instance, the instrument will function more efficiently if the source is moved closer to or farther away from the detector. Again, it may be desired to test different detectors or circuits within the logging instrument. It will be seen therefore that by merely placing a logging instrument within a porous mass or masses containing a known amount of hydrogen, calibration and other tests can be made quickly and efficiently.

As one example of a liquid containing no hydrogen, carbon tetrachloride can be mentioned. However, this material has the slight disadvantage that some of the slow neutrons are absorbed by the chlorine atoms. It is preferred to use one of the fluorocarbons, particularly $C_{21}F_{44}$.

Obviously, many other modifications and variations of the invention as hereinbefore set forth may be made without departing from the spirit and scope thereof, and therefore, only such limitations should be imposed as are indicated in the appended claims.

We claim:

1. In the testing of a neutron bore hole logging instrument adapted to respond to variations in the hydrogen content of earth formations, the method of simulating conditions of porosity and hydrogen content in the formations surrounding a bore hole, which comprises surrounding said instrument with a mass of sand, varying the amount of hydrogen in the pore spaces of said sand mass while also varying the bulk density of the mass in accordance with the changes in bulk density of the formations which it is desired to simulate, by saturating the mass with a mixture of two liquids, one containing hydrogen and the other having a low capture cross-section for slow neutrons, said last-mentioned liquid having substantially the same density as said sand, varying the proportions of said liquids and noting the response of said instrument when different proportions of said liquids are used.

2. In the testing of a neutron bore hole logging instrument adapted to respond to variations in the hydrogen content of earth formations, the method of simulating conditions of porosity which are present in the formations surrounding a bore hole, which comprises surrounding said instrument with a mass of porous material, and varying the amount of hydrogen in said mass while also varying the bulk density of the mass in accordance with the changes in bulk density of the formations which it is desired to simulate, by saturating the mass with a mixture of oil and a fluorcarbon, said fluorcarbon having substantially the same density as said porous material, and varying the proportions of said liquids.

3. For purposes of testing a neutron bore hole logging instrument adapted to respond to variations in the hydrogen content of earth formations, the method of simulating at the surface, conditions of porosity which are present in the formations surrounding a bore hole, which comprises surrounding said instrument with different masses of porous material, the pore spaces of each mass being filled with a mixture of two liquids in a predetermined ratio, one containing hydrogen and the other having a low capture cross-section for slow neutrons as well as substantially the same density as the particles of the porous material, and noting the response of said instrument when surrounded by each mass.

GERHARD HERZOG.
KARL C. TEN BRINK.

References Cited in the file of this patent

UNITED STATES PATENTS

| Number | Name | Date |
|---|---|---|
| 2,481,014 | Herzog | Sept. 6, 1949 |
| 2,509,908 | Crumrine | May 30, 1950 |
| 2,515,502 | Fearon et al. | July 18, 1950 |
| 2,515,534 | Crumrine | July 18, 1950 |
| 2,515,745 | Swift et al. | July 18, 1950 |